(12) United States Patent
Ji et al.

(10) Patent No.: US 10,899,577 B2
(45) Date of Patent: Jan. 26, 2021

(54) AUTOMATIC WINDING DEVICE

(71) Applicant: EM-TECH. Co., Ltd., Basan (KR)

(72) Inventors: Yong Ju Ji, Gyeongsangnam-do (KR); Jung Ho Kang, Gyeongsangnam-do (KR); Jun Hee Han, Gyeongsangnam-do (KR)

(73) Assignee: EM-TECH. CO., LTD., Busan (KR)

( * ) Notice: Subject to any disclaimer, the term of this patent is extended or adjusted under 35 U.S.C. 154(b) by 50 days.

(21) Appl. No.: 16/196,271

(22) Filed: Nov. 20, 2018

(65) Prior Publication Data
US 2019/0152739 A1 May 23, 2019

(30) Foreign Application Priority Data

Nov. 22, 2017 (KR) .................. 10-2017-0156313
Dec. 29, 2017 (KR) .................. 10-2017-0184843

(51) Int. Cl.
*B65H 75/48* (2006.01)
*H04R 1/10* (2006.01)
*B65H 75/44* (2006.01)
*H02G 11/02* (2006.01)

(52) U.S. Cl.
CPC ....... *B65H 75/486* (2013.01); *B65H 75/4434* (2013.01); *H04R 1/1033* (2013.01); *B65H 2701/3919* (2013.01); *H02G 11/02* (2013.01)

(58) Field of Classification Search
CPC .. B65H 75/486; B65H 75/4434; B65H 75/48; B65H 2701/3919; H04R 1/1033
See application file for complete search history.

(56) References Cited

U.S. PATENT DOCUMENTS

| 7,222,812 | B2 * | 5/2007 | Chang | B65H 75/4434 |
| | | | | 242/378.1 |
| 7,384,013 | B2 * | 6/2008 | Yen | B65H 75/4434 |
| | | | | 242/378 |
| 8,757,532 | B2 * | 6/2014 | Votel | B65H 75/4434 |
| | | | | 242/378 |
| 9,055,364 | B1 | 6/2015 | Uh et al. | |
| 2006/0011763 | A1 * | 1/2006 | Kuo | B65H 75/4434 |
| | | | | 242/378.1 |

FOREIGN PATENT DOCUMENTS

| CN | 202936037 U | 5/2013 |
| CN | 106687402 A | 5/2017 |
| KR | 101471903 B1 | 12/2014 |
| KR | 101748174 B1 | 6/2017 |

* cited by examiner

*Primary Examiner* — Sang K Kim
(74) *Attorney, Agent, or Firm* — Murphy, Bilak & Homiller, PLLC (57) ABSTRACT

An automatic winding device includes a lower casing having a shaft, a bobbin rotatably disposed on the shaft, a wire wound around the bobbin, a spring having a first end secured to the shaft and a second end secured to the bobbin to provide a rotational force to the bobbin, a track cover coupled to the bobbin and having tracks formed thereon, a pin positioned between the bobbin and the track cover to control rotation of the bobbin, and a pin guide spring configured to press the pin toward the track cover. The track cover includes an inner track having a radius of curvature increased and decreased along the circumferential direction, an outer track spaced apart from the inner track, a connection track configured to connect the inner and outer tracks, and a stop track configured to connect the inner and outer tracks and to stop the pin.

10 Claims, 9 Drawing Sheets

Fig. 1 (PRIORT ART)

ND DEVICE

TECHNICAL FIELD

The present invention relates to an automatic winding device. More specifically, the present invention relates to an automatic winding device for automatically winding a wire of a device, such as an earphone, mouse, etc., and more particularly, to an automatic winding device in which a pin-type structure is pressed against tracks by a spring to control rotation of a bobbin.

BACKGROUND

In general, an earphone is a receiver designed small enough to be placed into the ear. With the popularization of a smartphone, the time and opportunities to listen to music and watch videos on the smartphone have been increased, such that it has been common to enjoy music, movies, and UCC using the earphone, on the move.

However, the wire of the earphone is often twisted or tangled with other belongings in the bag, which leads to a short. In order to overcome the foregoing problem and increase the convenience of the user, an earphone or headset with an automatic winding function has been developed and put into use.

Figure 1:
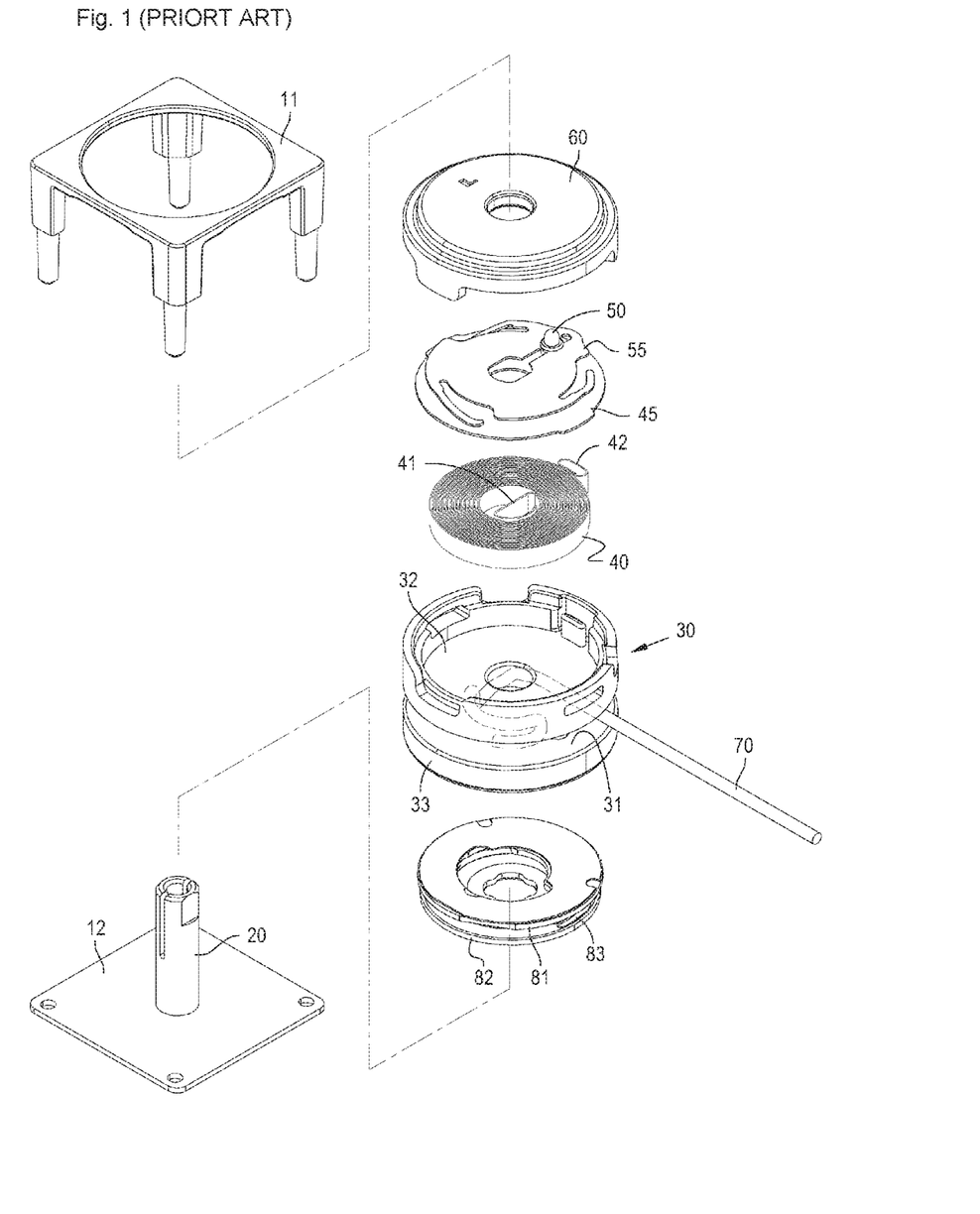
FIG. 1 is a view showing a conventional automatic winding device.

Korea Patent 10-1471903 discloses an automatic winding device employed in an electronic equipment. FIG. 1 is a view showing the conventional automatic winding device disclosed Korea Patent 10-1471903. The conventional automatic winding device includes a base plate 1, a fixing shaft 3 extended from any one surface of the base plate 1 in the vertical direction of the base plate 1, a wheel 9 through which the fixing shaft 3 passes, the wheel 9 rotating around the fixing shaft 3, a wire 15 having one end secured to the circumference of the wheel 9 and being wound around the circumference of the wheel 9 along the wheel 9, an elastic member 19 provided in a roll type, with one end secured to the fixing shaft 3 and the other end secured to any portion of the wheel 9, a cap 27 integrally coupled to the wheel 9 and rotating with the wheel 9, ball tracks 25 being formed on the surface of the cap 27 facing an upper casing 29, the upper casing 29 covered on the cap 27 and having a linear groove 35 into which a ball 31 is to be fitted, and the ball 31 fitted between the ball tracks 25 and the linear groove 35 of the upper casing 29, the ball 31 being fitted into the linear groove 35 and rotating on the ball tracks 25 when the cap 27 integrally coupled to the wheel 9 rotates in any one direction.

In addition, the ball tracks 25 include an outer track recessed in the circumferential direction of the cap 27, an inner track formed inwardly from the outer track and recessed in the circumferential direction of the cap 27, two or more recessed connection tracks for connecting the outer track and the inner track, and a recessed stop track for allowing the ball 31 to be seated in a contact portion of the connection track and the inner track.

Here, when the wire 15 is pulled, the wire 15 wound around the wheel 9 is unwound from the wheel 9, the elastic member 19 is shrunken at the same time as the wheel 9 and the cap 27 rotate in any one direction, and the ball 31 is fitted into the linear groove 35 and rotated on the outer track via the inner track and the connection track. Then, when the pulled wire 15 is released, the wheel 9 and the cap 27 rotate in the reverse direction due to the elastic restoring force of the elastic member 19, the ball 31 is moved in the longitudinal direction of the linear groove 35 and seated on the stop track through the connection track, and thus the wheel 9 and the cap 27 do not rotate any more to keep the wire 15 in a pulled state. In turn, when the stopped wire 15 is pulled and released, the ball 31 seated on the stop track escapes from the stop track and rotates along the inner track, and the wheel 9 and the cap 27 rotate in the reverse direction due to the elastic restoring force of the elastic member 19 to wind the wire 15 around the circumference of the wheel 9.

Here, the ball 31 is fitted into the linear groove 35 of the upper casing 29 and rotated on the ball tracks 25 in a fitted state when the cap 27 integrally coupled to the wheel 9 rotates in any one direction. Certain stepped portions are formed between the inner track, connection track, outer track and stop track of the ball tracks 25, such that the ball 31 should be able to move to another track over the stepped portion. Therefore, the distance between the stepped portions of the ball tracks 25 and the upper casing 29 should be greater than the diameter of the ball 31, as a result of which the ball 31 and the ball tracks 25 are not completely attached to each other. In addition, the size of the ball 31 or the depth of the ball tracks 25 should be large enough to prevent the ball 31 from easily moving to the connection track or the stop track while rotating along the inner track or the outer track, which makes it difficult to achieve miniaturization.

Figure 2:
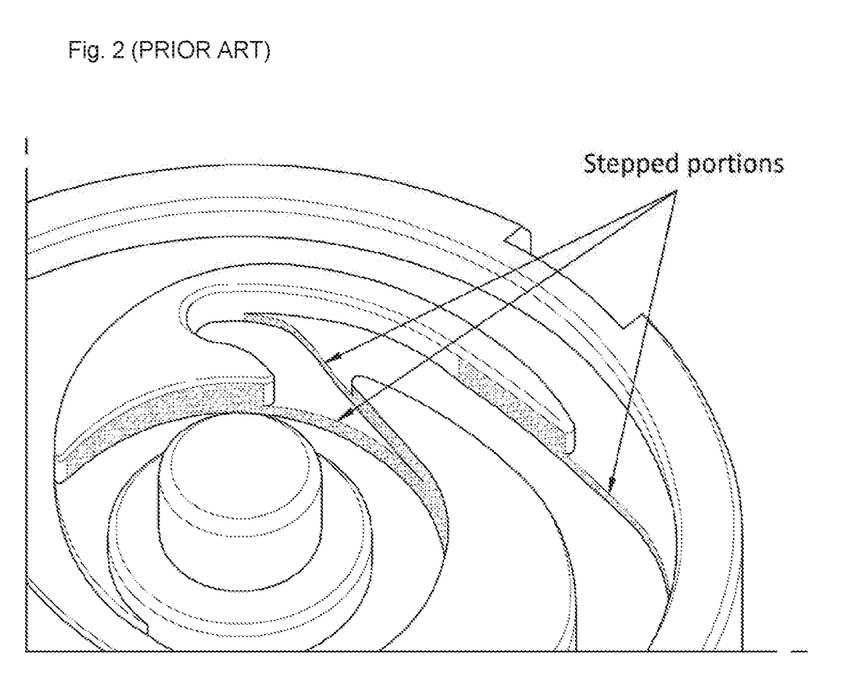
FIG. 2 is a view showing ball tracks provided in the conventional automatic winding device.

FIG. 2 is a view showing the ball tracks provided in the conventional automatic winding device. In the prior art, stepped portions are physically formed on the ball tracks along which the ball 31 moves, which prevents the entry of the ball 31 during the rotation in the reverse direction to prevent a malfunction. However, the conventional structure for preventing the malfunction using the physical stepped portions has a disadvantage in that the stepped portions are worn out for an extended period of use, such that the malfunction often occurs.

Furthermore, with the ball 31 fitted between the ball tracks 25 of the cap 27 and the upper casing 29, if an excessive pressure is exerted during the assembly, or if the assembly is loose, there is a high possibility of malfunction. In other words, the conventional structure is sensitive to changes in Z-axis height during the mechanical assembly.

SUMMARY

An object of the present invention is to provide an automatic winding device with improved operability and reliability.

According to an aspect of the present invention for achieving the above object, there is provided an automatic winding device, including a lower casing having a shaft, a bobbin rotatably disposed on the shaft, a wire being wound around the bobbin, a spring having one end secured to the shaft and the other end secured to the bobbin to provide a rotational force to the bobbin, a track cover coupled to the bobbin and having tracks formed thereon, a pin positioned between the bobbin and the track cover to control rotation of the bobbin, and a pin guide spring for pressing the pin toward the track cover, wherein the track cover includes an inner track having a radius of curvature increased and decreased along the circumferential direction, an outer track spaced apart from the inner track, a connection track for connecting the inner track and the outer track, and a stop track for connecting the inner track and the outer track and stopping the pin, the outer track includes a first spiral portion having a radius of curvature gradually decreased in a first rotational direction and a second spiral portion having a radius of curvature gradually decreased in a second rotational direction, the first spiral portion is connected to the stop track as the radius of curvature decreases during the rotation in the first rotational direction, and the second spiral portion is connected to the first spiral portion as the radius of curvature decreases during the rotation in the second rotational direction.

In some embodiments, the connection track may be connected to a section in which the radius of curvature of the inner track increases during the rotation in the second direction.

In some embodiments, the stop track may be connected to a section in which the radius of curvature of the inner track decreases during the rotation in the first direction.

In some embodiments, there may be no stepped portion on the inner track, outer track, connection track and stop track.

In some embodiments, the pin guide spring may include a fixing portion fitted onto the shaft, a rail portion extended from the fixing portion to guide the pin, and a support portion extended opposite to the rail portion from the fixing portion and bent to contact the bottom surface of the track cover.

In some embodiments, the shaft may have a longitudinal groove formed in the periphery in the axial direction, and the fixing portion of the pin guide spring may have a projection inserted into the longitudinal groove.

In some embodiments, the shaft may have a transverse groove formed in the periphery in the circumferential direction, and the fixing portion of the pin guide spring may be inserted into the transverse groove, the automatic winding device further including an E-ring inserted into the transverse groove and disposed at the lower portion of the pin guide spring.

In some embodiments, the bobbin may include first and second fixing projections positioned side by side to secure the spring, and the spring may include a bending portion for surrounding the periphery of the first fixing projection and a U-shaped hook portion for surrounding the inside and outside of the second fixing projection.

In some embodiments, the tip end of the hook portion may be positioned outside the second fixing projection.

In some embodiments, the end of the first fixing projection may be smoothly curved.

In some embodiments, the automatic winding device may further include a lower plate disposed between the bobbin and the spring and provided with a plurality of punched portions.

In some embodiments, the automatic winding device may further include an upper plate disposed at the upper portion of the spring and provided with an upwardly-projecting space.

The automatic winding device according to the present invention can determine the proceeding direction of the pin that moves on the outer track, by causing the radius of curvature of the connection track on the bottom surface of the track cover to increase from the inside to the outside, which leads to a smooth operation.

In addition, the automatic winding device according to the present invention can offset a Z-axis direction mechanical tolerance and more precisely and flexibly implement the operation, by controlling the winding using the pin pressed by the pin guide soling along the tracks.

Moreover, the automatic winding device according to the present invention can prevent the hook outside the soling from being straightened and also prevent fatigue failure from occurring.

Further, the automatic winding device according to the present invention can avoid cracks of the spring, by providing grease collection spaces that prevent leakage of the grease for lubricating the spring.

Those skilled in the art will recognize additional features and advantages upon reading the following detailed description, and upon viewing the accompanying drawings.

DETAILED DESCRIPTION

Hereinafter, a preferred embodiment of an automatic winding device according to the present invention will be described in detail with reference to the accompanying drawings.

Figure 3:
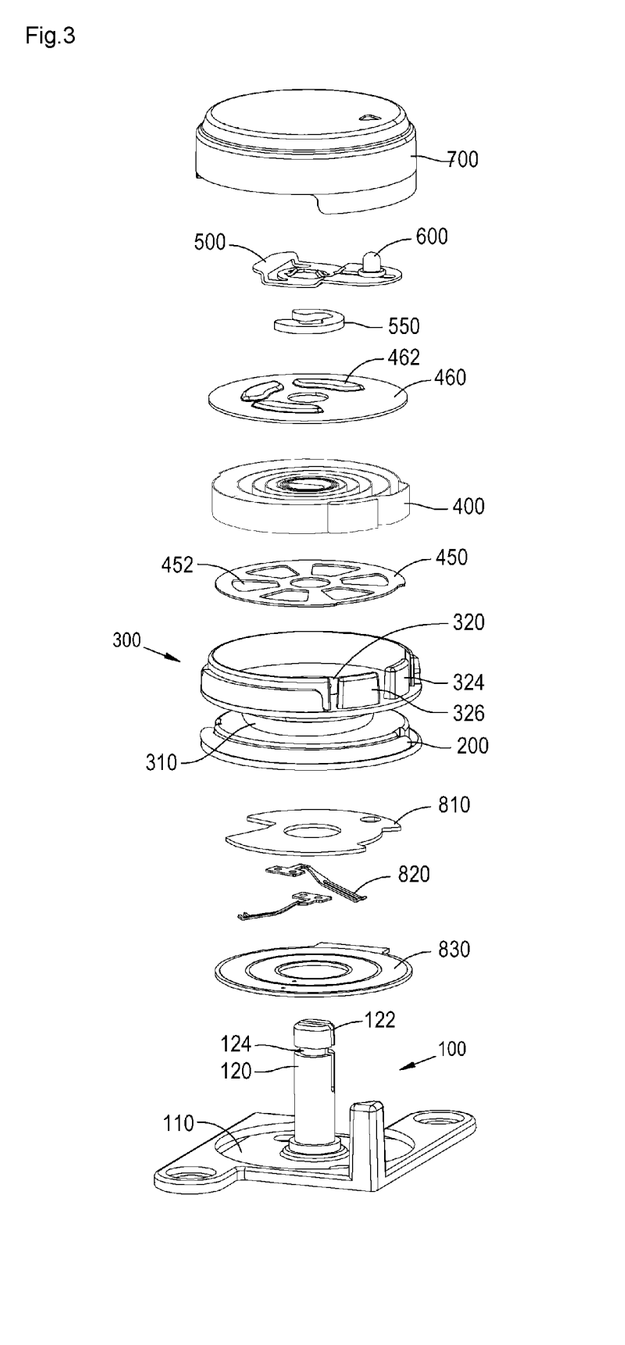
FIG. 3 is an exploded view showing an automatic winding device according to one embodiment of the present invention.

FIG. 3 is an exploded view showing an automatic winding device according to one embodiment of the present invention. In the automatic winding device according to one embodiment of the present invention, respective components of the automatic winding device are coupled on a lower casing 100 positioned on the lowest side of the automatic winding device and provided with a shaft 120. The shaft 120 may be separately formed and then coupled to the lower casing 100 or may be integrally formed with the lower casing 100. Some components of the automatic winding device are rotatably coupled to the shaft 120, while the other components are non-rotatably coupled to the shaft 120.

A bobbin 300 is rotatably disposed on the shaft 120, a winding part 310 around which a wire 200 is wound being positioned at an intermediate portion thereof. The wire 200 is wound around and received in the winding part 310. Disc-shaped walls that have a larger diameter than that of the winding part 310 and that can receive other components are arranged at the upper and lower portions of the winding part 310. The upper wall is provided with a spring receiving part 320 for receiving a spring 400 discussed later, while the lower wall is provided with a circuit receiving part 330 for receiving circuits 810, 820 and 830 discussed later. A sidewall is formed along the periphery of the spring receiving part 320, and three slits are formed in the sidewall, thus dividing the sidewall into a long sidewall 322 and two projections 324 and 326.

The spring 400 is a spiral spring, with an inner end 410 secured to the shaft 120 and an outer end 420 secured to the projections 324 and 326 of the bobbin 300. The shaft 120 has a slit 122 into which the inner end 410 is fixedly inserted. When the wire 200 is unwound from the bobbin 300, the spring 400 shrinks and stores energy, and when the spring 400 is restored to its original stage, the stored energy rotates the bobbin 300 to wind the wire 200 again.

A lower plate 450 is disposed at the lower portion of the spring 400, while an upper plate 460 is disposed at the upper portion thereof. A pin guide spring 500, which is vertically moveable, is disposed on the top surface of the upper plate 460, a pin 600 is disposed on the pin guide spring 500, and the pin guide spring 500 presses the pin 600 toward a track cover 700 discussed later. The pin 600 moves along tracks formed on the track cover 700. Strictly speaking, the track cover 700 only performs a rotational motion with the bobbin 300, and the pin 600 performs both the linear motion in the radial direction and the vertical motion by the pin guide spring 500. An E-ring 550 for the use in installing and fixing the pin guide spring 500 may be interposed between the pin guide spring 500 and the upper plate 460.

A terminal 810 connected to the wire 200, a PCB (printed circuit board) 830 for the power connection to the outside of the automatic winding device, and a brush 820 secured to the wire-side terminal 810 and brought into contact with the PCB 830 to provide the power connection between the terminal 810 and the PCB 830 are received at the lower portion of the bobbin 300. Since the PCB 830 is secured to the lower casing 120 and the terminal 810 is disposed at the bobbin 300 and rotated, the power connection is made by the brush 820.

Figure 4:
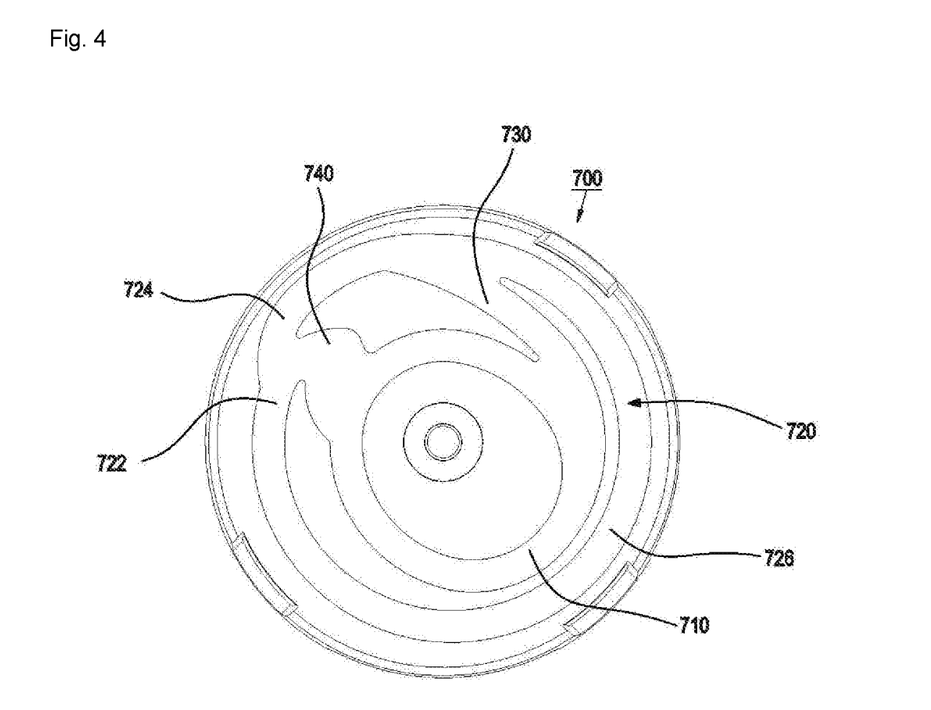
FIG. 4 is a view showing a bottom surface of a track cover provided in the automatic winding device according to one embodiment of the present invention.

FIG. 4 is a view showing the bottom surface of the track cover. The tracks are formed on the bottom surface of the track cover 700, including an inner track 710 having a distance from the shaft that varies along the circumferential direction, an outer track 720 spaced apart from the inner track 710, a connection track 730 for connecting the inner track 710 and the outer track 720, and a stop track 740 for connecting the inner track 710 and the outer track 720, the pin 600 (see FIG. 3) being seated on the stop track 740.

Referring to FIG. 2, the conventional ball tracks are intended to prevent mis-rotation, using the stepped portions on the tracks, but the stepped portions on the tracks are worn out for an extended period of use, which possibly leads to a malfunction.

However, in the case of the tracks provided in the track cover 700 according to one embodiment of the present invention, the inner track 710 and the outer track 720 are not circular, with a radius of curvature decreased or increased during the rotation, and the pin 600 follows the radius-decreased path or the radius-increased path of the track depending on the rotational direction. Actually, although the track cover 700 rotates and the pin 600 merely performs the linear motion, for convenience, the description is made, assuming that the pin 600 rotates and moves. In the drawing, when the pin 600 rotates along the track in the counterclockwise direction, the wire 200 is unwound, and when the pin 600 rotates in the clockwise direction, the wire 200 is wound again.

The inner track 710 is generally oval, with a radius increased and then decreased. When the pin 600 rotates on the inner track 710 in the clockwise direction, it only rotates along the inner track 710, the radius of curvature of the inner track 710 being increased, decreased, increased, and decreased in a repeated manner. The inner track 710 and the stop track 740 are connected in a position in which the radius of curvature of the inner track 710 is being decreased. Therefore, the pin 600 moving on the inner track 710 tends to move in a direction in which the radius of curvature is decreased. As a result, the pin 600 does not head to the stop track 740 positioned in a direction in which the radius of curvature is increased, but continuously rotates along the inner track 710. It is thus possible to prevent the pin 600 from mistakenly moving from the inner track 710 to the stop track 740, without needing to interpose a stepped portion between the inner track 710 and the stop track 740 to prevent the movement toward the stop track 740.

When the pin 600 rotates on the inner track 710 in the counterclockwise direction, it moves in a direction in which the radius of curvature of the inner track 710 is increased, then proceeds to the connection track 730 positioned on a path in which the radius of curvature of the inner track 710 is increased, then moves to the outer track 720 and continuously rotates along the outer track 720.

The outer track 720 is generally circular, with a first spiral portion 722 and a second spiral portion 724 at one side, the first spiral portion 722 having a curvature gradually decreased during the clockwise rotation, the second spiral portion 724 having a curvature gradually decreased during the counterclockwise rotation. The first spiral portion 722 is connected to the stop track 740 as its curvature is gradually decreased in the clockwise direction, and the second spiral portion 724 is connected to the first spiral portion 722 as its curvature is gradually decreased in the counterclockwise direction. Accordingly, the pin 600 that moves from the inner track 710 to the outer track 720 via the connection track 730 continuously rotates along the second spiral portion 724, the first spiral portion 722 and a circular section 726 in the counterclockwise direction.

When the pin 600 rotates on the outer track 720 in the clockwise direction, it rotates sequentially along the second spiral portion 724, the circular section 726 and the first spiral portion 722. When the pin 600 reaches the first spiral portion 722 while rotating in the counterclockwise direction, it moves in a direction in which the radius of the first spiral portion 722 is decreased, then moves to the stop track 740 instead of the second spiral portion 724, and then stops on the stop track 740. Here, when the pin 600 moves along the circular section 726, it tends to continuously follow the circular path, such that there is no reverse entry from the circular section 726 to the connection track 730 in which the radius is decreased. As a result, there is no need for a stepped portion for preventing entry from the outer track 720 to the connection track 730.

When the pin 600 stops on the stop track 740, if the wire 200 is slightly pulled and released, the pin 600 rotates in the counterclockwise direction, enters the inner track 710, and then continuously rotates in the clockwise direction, to wind the wire 200 around the bobbin 300.

Meanwhile, when the pin 600 stops on the stop track 740, if the wire 200 is continuously pulled, as mentioned above, the pin 600 rotates on the stop track 740 in the counterclockwise direction, enters the inner track 710, and then continuously rotates in the counterclockwise direction on the outer track 720 via the connection track 730, to unwind the wire 200 from the bobbin 300.

Figure 5:
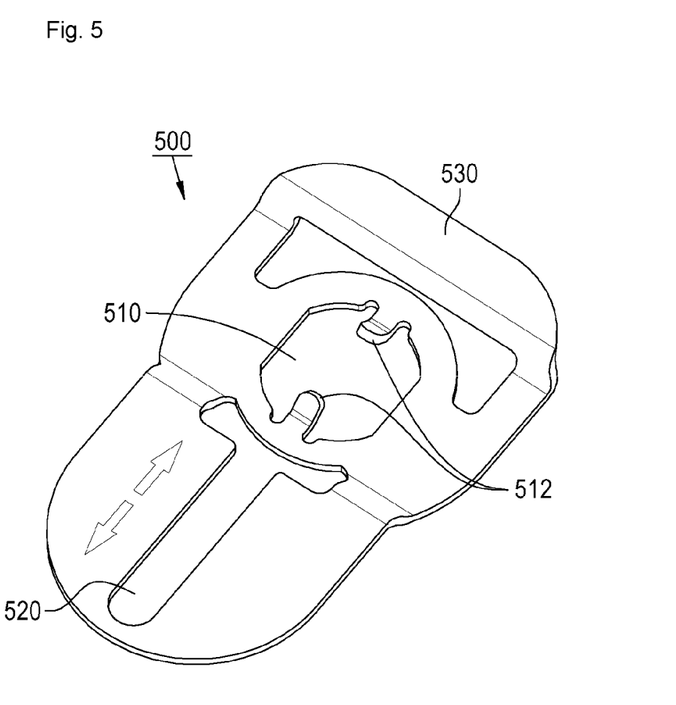
FIG. 5 is a view showing a pin guide spring provided in the automatic winding device according to one embodiment of the present invention.
Figure 6:
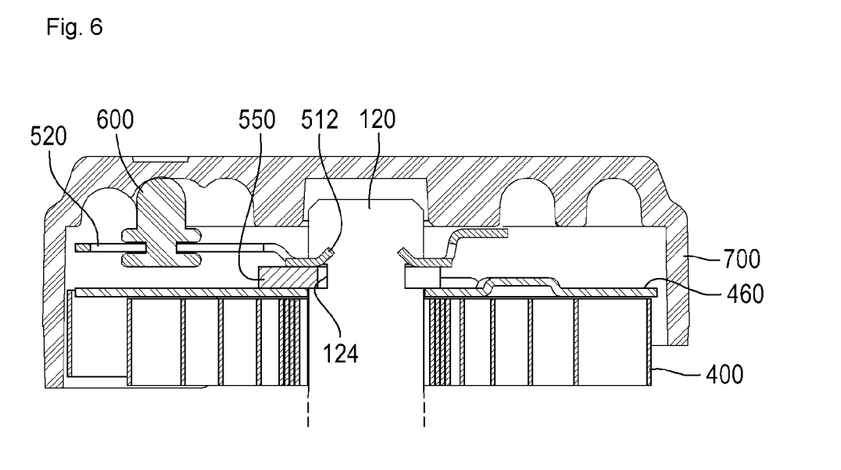
FIG. 6 is a sectional view showing an installed structure of the pin guide spring provided in the automatic winding device according to one embodiment of the present invention.

FIG. 5 is a view showing the pin guide spring provided in the automatic winding device according to one embodiment of the present invention, and FIG. 6 is a view showing an installed structure of the pin guide spring provided in the automatic winding device according to one embodiment of the present invention. The pin guide spring 500 includes a fixing portion 510 fitted onto the periphery of the shaft 120, a rail portion 520 extended from the fixing portion 510 to one side and provided with a rail slit along which the pin 600 performs a linear motion, and a support portion 530 extended opposite to the rail portion 520 and upwardly bent to contact the track cover 700. The E-ring 550 is disposed at the lower portion of the pin guide spring 500 to define an interval between the pin 600 moving along the rail portion 520 and the upper plate 460. Projections 512 are formed on the fixing portion 510 to be inserted into the slit 122 of the shaft 120 described above, thus securing the pin guide spring 500 not to rotate relative to the shaft 120. On one hand, a transverse groove 124 is formed in the periphery of the shaft 120 in the circumferential direction, and some portion of the E-ring 550 is inserted into the transverse groove 124.

The rail portion 520 is bent to be positioned above the fixing portion 510, but is not brought into contact with the track cover 700. The rail portion 520 upwardly presses the pin 600 so that the top end of the pin 600 can continuously contact the tracks of the track cover 700. Here, if there is a tolerance in the contact portion of the pin 600 and the track, the flexible vertical bending capability of the rail portion 520 ensures excellent operability. In addition, even when the pin 600 moves over the stepped portions of the tracks of the track cover 700, it can smoothly move along the path. Further, the pin guide spring 500 is made of durable SUS, so it is not worn out for an extended period of continuous use and it can implement an appropriate operation. In order to aid in bending and restoring the rail portion 520, the support portion 530 is disposed opposite to the rail portion 520. When the rail portion 520 is downwardly bent, the support portion 530 touches and supports the track cover 700.

Figure 7:
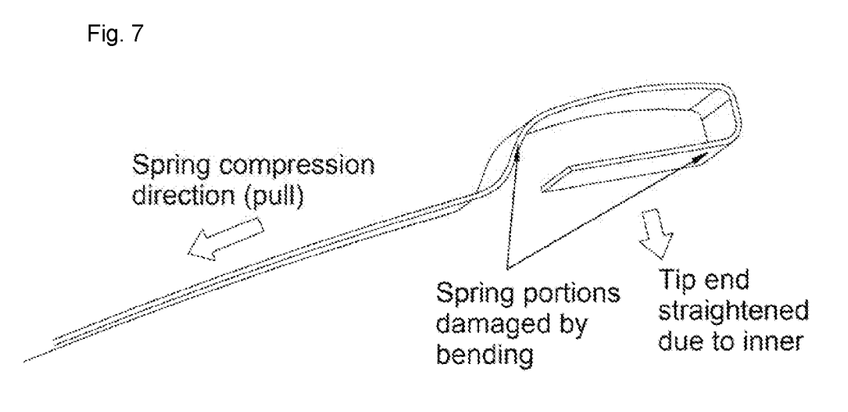
FIG. 7 is a view showing an end of a spring provided in the conventional automatic winding device.

FIG. 7 is a view showing the end of the spring provided in the conventional automatic winding device. In the conventional automatic winding device, when the spring is compressed, a pulling force is generated, which causes a tip end of a hook which is a connection portion of the spring and the bobbin to be straightened and released from the fixing portion of the bobbin, and which also causes the spring from being bent and damaged.

Figure 8:
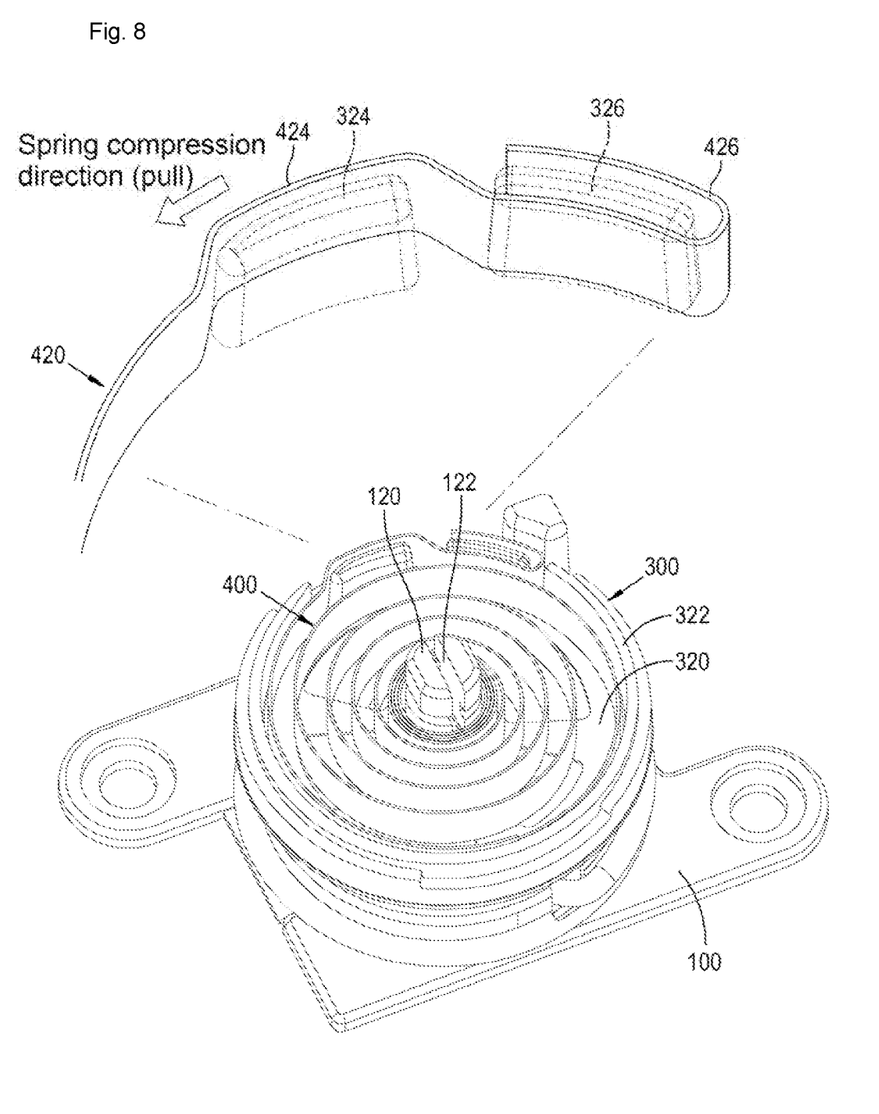
FIG. 8 is a view showing a fixed structure of a spring and a bobbin provided in the automatic winding device according to one embodiment of the present invention.

FIG. 8 is a view showing a fixed structure of the spring and the bobbin provided in the automatic winding device according to one embodiment of the present invention.

The sidewall is formed along the periphery of the spring receiving part 320 provided at the upper portion of the bobbin 300, and three slits are formed in the sidewall, thus dividing the sidewall into the long sidewall 322 and the two projections 324 and 326. As described above, the inner end of the spring 400 is fixedly inserted into the slit 122 of the shaft 120, and the outer end 420 of the spring 400 is secured to the sidewall. The outer end 420 of the spring 400 includes a bending portion 424 drawn out of the sidewall through the slit and bent to surround the outer surface of the first projection 324 and a U-shaped hook portion 426 extended from the outside to the inside of the sidewall through the slit to surround the inner and outer surfaces of the second projection 326. When the spring 400 is compressed, there is a force of pulling the outer end 420 of the spring 400 in a direction indicated by an arrow in the drawing. Here, the bending portion 424 is arranged in front of the hook portion 426, which prevents the hook portion 426 from being straightened during the compression of the spring 400. In addition, the end of the hook portion 426 is positioned outside the sidewall, which prevents the curl and the end of the spring 400 from rubbing against each other, which damages the curl of the spring 400.

Further, the front end (in the pulling direction) of the first projection 324 is smoothly curved, which minimizes fatigue accumulation occurring in the spring 400 during the compression and relaxation of the spring 400 to prevent fatigue failure.

Figure 9:
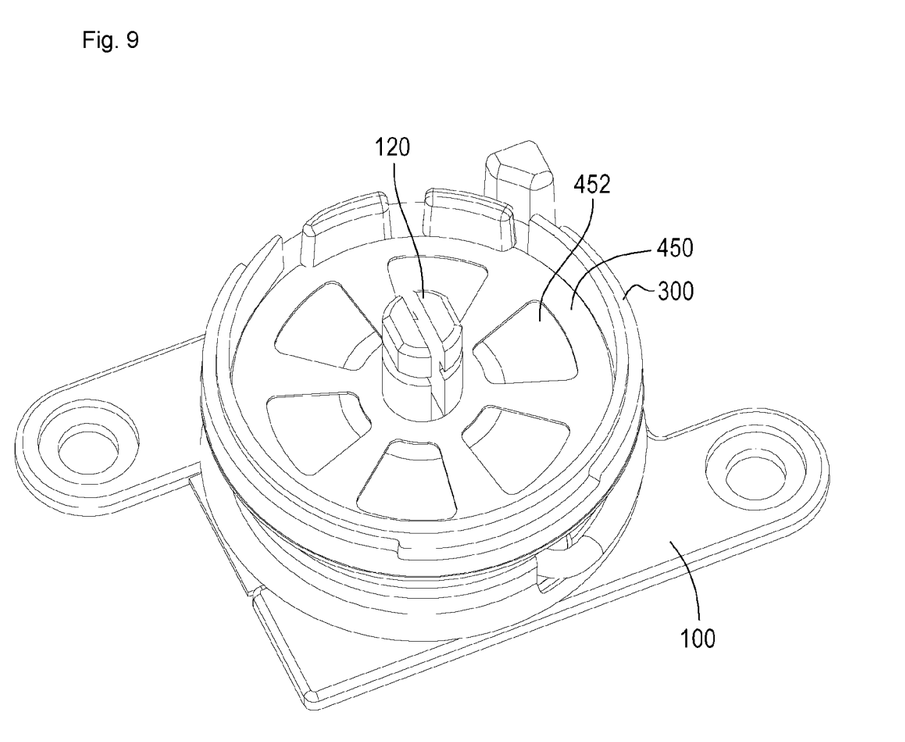
FIGS. 9 and 10 are views showing a main spring lubrication structure of the automatic winding device according to one embodiment of the present invention.
Figure 10:
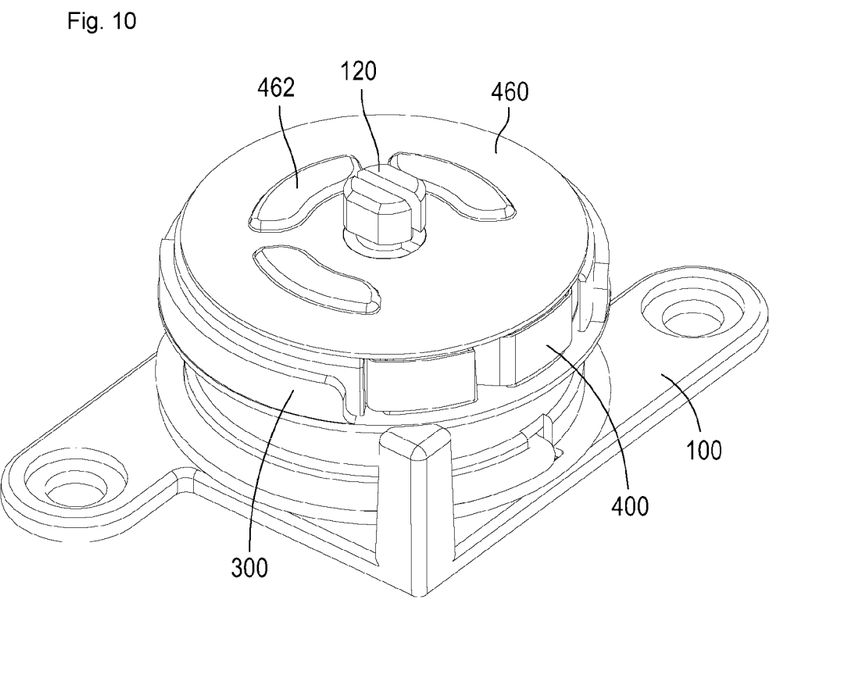

FIGS. 9 and 10 are views showing a main spring lubrication structure of the automatic winding device according to one embodiment of the present invention. The lower plate 450 is disposed at the lower portion of the spring 400, while the upper plate 460 is disposed at the upper portion of the spring 400. The lower plate 450 is positioned in the spring receiving part 320, i.e., between the bobbin 300 and the spring 400. The lower plate 450 includes a plurality of punched portions 452. Also, the upper plate 460 includes a plurality of upwardly-projecting spaces 462 formed by stamping or the like. Grease is collected in the punched portions 452 and the projecting spaces 462, which lubricates the spring 400 to prevent the respective curls of the spring 400 from rubbing against one another, which generates heat and cracks. As a result, it leads to an improvement in operational reliability of the automatic winding device.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An automatic winding device, comprising:
a lower casing having a shaft;
a bobbin rotatably disposed on the shaft, a wire being wound around the bobbin;
a spring having a first end secured to the shaft and a second end secured to the bobbin to provide a rotational force to the bobbin;
a track cover coupled to the bobbin and having tracks formed thereon;
a pin positioned between the bobbin and the track cover to control rotation of the bobbin; and
a pin guide spring configured to press the pin toward the track cover,
wherein the track cover includes an inner track having a radius of curvature increased and decreased along a circumferential direction, an outer track spaced apart from the inner track, a connection track configured to connect the inner track and the outer track, and a stop track configured to connect the inner track and the outer track and to stop the pin,
wherein the outer track includes a first spiral portion having a radius of curvature gradually decreased in a first rotational direction, and a second spiral portion having a radius of curvature gradually decreased in a second rotational direction,
wherein the first spiral portion is connected to the stop track as the radius of curvature decreases during rotation in the first rotational direction, and the second spiral portion is connected to the first spiral portion as the radius of curvature decreases during rotation in the second rotational direction,
wherein the connection track is connected to a section in which the radius of curvature of the inner track increases during rotation in the second direction,
wherein the stop track is connected to a section in which the radius of curvature of the inner track decreases during rotation in the first direction.

2. The automatic winding device of claim 1, wherein there is no stepped portion on the inner track, outer track, connection track and stop track.

3. The automatic winding device of claim 1, wherein the pin guide spring comprises a fixing portion fitted onto the shaft, a rail portion extended from the fixing portion to guide the pin, and a support portion extended opposite to the rail portion from the fixing portion and bent to contact a bottom surface of the track cover.

4. The automatic winding device of claim 3, wherein the shaft has a longitudinal groove formed in a periphery in the axial direction, and wherein the fixing portion of the pin guide spring has a projection inserted into the longitudinal groove.

5. The automatic winding device of claim 1, wherein the shaft has a transverse groove formed in a periphery in the circumferential direction, and wherein the fixing portion of the pin guide spring is inserted into the transverse groove, the automatic winding device further comprising an E-ring inserted into the transverse groove and disposed at the lower portion of the pin guide spring.

6. The automatic winding device of claim 1, wherein the bobbin comprises first and second fixing projections positioned side by side to secure the spring, and wherein the spring comprises a bending portion configured to surround a periphery of the first fixing projection and a U-shaped hook portion configured to surround inside and outside of the second fixing projection.

7. The automatic winding device of claim 6, wherein a tip end of the U-shaped hook portion is positioned outside the second fixing projection.

8. The automatic winding device of claim 6, wherein an end of the first fixing projection is smoothly curved.

9. The automatic winding device of claim 1, further comprising a lower plate disposed between the bobbin and the spring and provided with a plurality of punched portions.

10. The automatic winding device of claim 1, further comprising an upper plate disposed at an upper portion of the spring and provided with an upwardly-projecting space.

* * * * *